United States Patent
Li et al.

(10) Patent No.: US 9,160,895 B2
(45) Date of Patent: Oct. 13, 2015

(54) METHOD AND APPARATUS FOR QUICKLY RESPONDING TO SIGNAL

(71) Applicant: Huawei Technologies Co., Ltd., Shenzhen, Guangdong (CN)

(72) Inventors: Zhe Li, Shanghai (CN); Kun Wang, Shanghai (CN); Jiayin Lu, Shanghai (CN); Qiwei Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/870,575

(22) Filed: Apr. 25, 2013

(65) Prior Publication Data

US 2013/0293779 A1    Nov. 7, 2013

(30) Foreign Application Priority Data

Apr. 28, 2012  (CN) .......................... 2012 1 0131947

(51) Int. Cl.
*H04N 5/06*  (2006.01)
*H04N 9/45*  (2006.01)
*H04N 9/455*  (2006.01)
*G09G 5/36*  (2006.01)
*G09G 5/00*  (2006.01)
*G09G 5/12*  (2006.01)

(52) U.S. Cl.
CPC ................. *H04N 5/06* (2013.01); *G09G 5/006* (2013.01); *G09G 5/12* (2013.01); *G09G 5/36* (2013.01); *G09G 2320/0276* (2013.01); *G09G 2340/045* (2013.01); *G09G 2340/0492* (2013.01); *G09G 2370/10* (2013.01)

(58) Field of Classification Search
USPC .......... 348/607, 521, 739, 525; 345/545, 204, 345/531, 547, 520
IPC ...................................... H04N 5/06,9/45, 9/455
See application file for complete search history.

(56) References Cited

U.S. PATENT DOCUMENTS

| | | | |
|---|---|---|---|
| 7,324,114 B2* | 1/2008 | Mutanen et al. ............... | 345/545 |
| 8,013,836 B2* | 9/2011 | Kashito et al. ................ | 345/156 |
| 8,934,065 B2* | 1/2015 | Choi et al. ...................... | 349/33 |
| 2004/0239677 A1 | 12/2004 | Mutanen et al. | |
| 2005/0024392 A1 | 2/2005 | Lee | |
| 2008/0174540 A1 | 7/2008 | Lee | |
| 2009/0135106 A1* | 5/2009 | Lee et al. ........................ | 345/76 |
| 2010/0277407 A1 | 11/2010 | Lin | |
| 2011/0169860 A1 | 7/2011 | Ito | |

FOREIGN PATENT DOCUMENTS

| | | |
|---|---|---|
| CN | 1577302 A | 2/2005 |
| CN | 1816844 A | 8/2006 |
| CN | 101017655 A | 8/2007 |
| CN | 101661697 A | 3/2010 |
| JP | 2010205252 A | 9/2010 |
| KR | 100885913 B1 | 2/2009 |

* cited by examiner

Primary Examiner — Trang U Tran (57) ABSTRACT

An embodiment of the present invention discloses a method for quickly responding to a signal, where the method includes: generating a frame synchronization signal; pre-reading image data, and saving the image data after processing the image data; and receiving a TE signal, and outputting the processed image data according to the TE signal. An embodiment of the present invention further discloses an apparatus for quickly responding to a signal. Using the present invention may improve a rate for responding to a signal and reduce an instantaneous bandwidth pressure on a transmission line.

13 Claims, 7 Drawing Sheets

FIG. 11

METHOD AND APPARATUS FOR QUICKLY RESPONDING TO SIGNAL

CROSS-REFERENCE TO RELATED APPLICATION

This application claims priority to Chinese Patent Application No. 201210131947.7, filed on Apr. 28, 2012, which is hereby incorporated by reference in its entirety.

TECHNICAL FIELD

The present invention relates to the communications field, and in particular to a method and an apparatus for quickly responding to a signal.

BACKGROUND

In a display system, there are two modes for an image engine to output image data to a display screen: a video mode and a command mode. When the video mode is selected, the image engine controls a time sequence of display and a display screen controller displays received image data on the screen. A display screen that supports the command mode, however, has one or more memories. The image engine first writes image data into a memory of the display screen, and the display screen controller reads image data in the memory and provides the read data for the display screen. When image data in a memory of the display screen is updated, an image displayed on the display screen is updated accordingly. When a rate for updating data in a memory, that is, a rate for the image engine to write data into a memory of the display screen, does not match a rate for the display screen controller to read data, tearing occurs on the screen. That is, content of two or more frames is simultaneously displayed on the screen. To achieve matching between a read rate and a write rate, the screen that supports the command mode usually uses an output pin tearing effect (Tearing Effect, TE) signal to indicate current time sequence information of the display screen, such as frame idleness information or row idleness information, to the image engine. In addition, for a display screen that supports a display serial interface (Display Serial Interface, DSI) command mode of the Mobile Industry Processor Interface (Mobile Industry Processor Interface, MIPI) organization, TE information may also be indicated by using an MIPI (Display Command Set, DCS) command. The image engine may determine, according to received TE information, an opportunity for updating a memory of the display screen.

In the prior art, a method for responding to a TE signal includes two modes: a manual mode and an automatic mode. In the manual mode, after 1 is written into a corresponding register TE_MANUAL in an image engine, the image engine transmits image data to a display screen. In this case, an opportunity for configuring the register TE_MANUAL needs to be determined by software. In the automatic mode, after receiving a TE signal, the image engine reads image data from a memory, processes raw image data according to an application requirement, and outputs the processed image data to the display screen through a display interface. In the automatic mode, image data is read from a memory and output only after a TE signal is received, which causes a slow rate for responding to a TE signal. In an extreme case, for example, a valid level of a TE signal sent by the display screen only lasts time of 4 rows, if time for the image engine to read a memory plus time for image processing is larger than the time of 4 rows, a tearing effect may be caused on the display screen. When a TE signal arrives, especially when other data is transmitted on a bus, the image engine obtains image data and processes the image data, which increases an instantaneous bandwidth pressure on the bus used for data transmission. In addition, only two response modes, manual and automatic, exist. In the automatic mode, the image engine responds to all TE signals. In this way, for a specific scenario where a requirement for a refresh frame rate is not high, power consumption is quite high and a performance waste exists; if the manual mode is used to reduce an output frame rate, software intervention, such as interrupt processing, is required, and therefore efficiency is low.

SUMMARY

A technical problem to be solved in embodiments of the present invention lies in providing a method and an apparatus for quickly responding to a signal, which may improve a rate for responding to a signal, and reducing an instantaneous bandwidth pressure on a transmission line.

To solve the foregoing technical problem, an embodiment of the present invention provides a method for quickly responding to a signal, where the method includes:
generating a frame synchronization signal;
pre-reading image data, and saving the image data after processing the image data; and
receiving a TE signal, and outputting the processed image data according to the TE signal.

A size of the pre-read image data is determined according to a requirement of an application.

An operation of processing the image data includes image zooming-in, zooming-out, rotation, and gamma correction.

The step of receiving a TE signal, and outputting the processed image data according to the TE signal includes:
determining whether the step of outputting the processed image data relies on the TE signal;
if yes, waiting for and receiving the TE signal;
determining whether the received TE signal is valid; and
if yes, responding to the TE signal, and outputting the processed image data according to the TE signal; and
outputting the processed image data if the step of outputting the processed image data does not rely on the TE signal.

The step of outputting the processed image data if the step of outputting the processed image data does not rely on the TE signal includes:
determining whether the processed image data exists;
if yes, outputting the processed image data; and
if no, waiting until reading and processing of the image data is completed, and then outputting the processed image data.

After the responding to the TE signal when a determining result of determining whether the received TE signal is valid is yes, the method further includes the following steps:
determining whether the processed image data exists;
if yes, outputting the processed image data; and
if no, waiting until reading and processing of the image data is completed, and then outputting the processed image data.

The step of determining whether the received TE signal is valid includes:
selecting a type of the TE signal to be received;
setting a response mode for the TE signal; and
responding to or ignoring the TE signal according to the response mode.

The type of the TE signal includes a first type and a second type, where the first type includes frame idleness information and row idleness information or includes only frame idleness information, and the second type is a TE signal that is formed after a string of sequences returned by a display screen that is used to display an image is parsed.

A TE signal that meets an application requirement feature is identified and extracted when the type which is of the TE signal and is selected for receiving is the first type.

The step of identifying and extracting a TE signal that meets an application requirement feature includes:

setting a threshold of frame idleness and a threshold of row idleness, and identifying frame idleness information and row idleness information; and setting a position of row idleness where a response is required, and extracting, in a manner of counting, the TE signal that meets the application requirement feature.

After the responding to the TE signal, and outputting the processed image data according to the TE signal, the method further includes:

determining whether a response mode of a next frame of image changes, where if yes, the response mode of the next frame of image is reset; otherwise, resetting is not required.

Accordingly, an embodiment of the present invention further provides an apparatus for quickly responding to a signal, where the apparatus includes:

an image engine module, configured to generate a frame synchronization signal, pre-read image data, process the image data, receive a TE signal, and output the processed image data according to the TE signal;

a memory module, configured to store the image data; and a bus module, configured for data transmission and communications between various modules.

The image engine module includes:

a synchronization signal generating unit, configured to generate a frame synchronization signal;

a processing unit, configured to pre-read image data in the memory module, process the image data, receive a TE signal, and output the processed image data according to the TE signal; and a display buffer unit, configured to save the processed image data.

A size of the pre-read image data is determined according to a requirement of an application.

An operation of processing the image data includes image zooming-in, zooming-out, rotation, and gamma correction.

The image engine module further includes:

a first determining unit, configured to determine whether the step of outputting the processed image data relies on the TE signal, where when a determining result of the first determining unit is yes, the image engine module waits for and receives the TE signal; otherwise, the image engine module outputs the processed image data; and a second determining unit, configured to, when the determining result of the first determining unit is yes, determine whether the TE signal received by the image engine module is valid, where when a determining result of the second determining unit is yes, the image engine module responds to the TE signal, and outputs the processed image data according to the TE signal; otherwise, the image engine module continues to wait for and receive the TE signal.

The image engine module further includes:

a third determining unit, configured to, when a determining result of the first determining unit is no and after the TE signal is responded to, determine whether the processed image data exists in the display buffer unit, where when a determining result of the third determining unit is yes, the image engine module outputs the processed image data; otherwise, the image engine module waits until the image engine module completes reading and processing the image data, and then outputs the processed image data.

The second determining unit includes:

a signal type selecting subunit, configured to select a type of the TE signal to be received; and a signal shielding subunit, configured to set a response mode of the image engine module for the TE signal, and control the image engine module to respond to or ignore the TE signal.

The type of the TE signal includes a first type and a second type, where the first type includes frame idleness information and row idleness information or includes only frame idleness information, and the second type is a TE signal that is formed after a string of sequences returned by a display screen that is used to display an image is parsed.

The second determining unit further includes:

a signal feature identifying subunit, configured to, when a type which is of the TE signal and is selected by the signal type selecting subunit is the first type, identify and extract a TE signal that meets an application requirement feature.

Implementing the embodiments of the present invention achieves the following beneficial effects:

According to a requirement of an application, a method of pre-reading part of image data and saving the image data after processing the image data is used to reduce, when a TE signal arrives, time for responding to the TE signal and outputting image data, improve a rate for responding to the TE signal, and avoid that a tearing effect occurs on a display screen due to a response delay; at the same time, an instantaneous bandwidth pressure on a transmission line may be reduced during a peak period of signal transmission and data processing by pre-reading part of image data; outputting the processed image data may be configured as relying or not relying on the TE signal, and flexible control on a response to the TE signal may be implemented through diversified signal type selection and diversified signal response mode selection, thereby implementing diversified flexible configurations according to requirements of different application scenarios; and in combination with consideration of efficiency and energy consumption, part of TE signals are ignored and an output frame rate of an image engine module is reduced, thereby reducing power consumption of an apparatus.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description are merely some embodiments of the present invention, and persons of ordinary skill in the art may further obtain other drawings according to these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
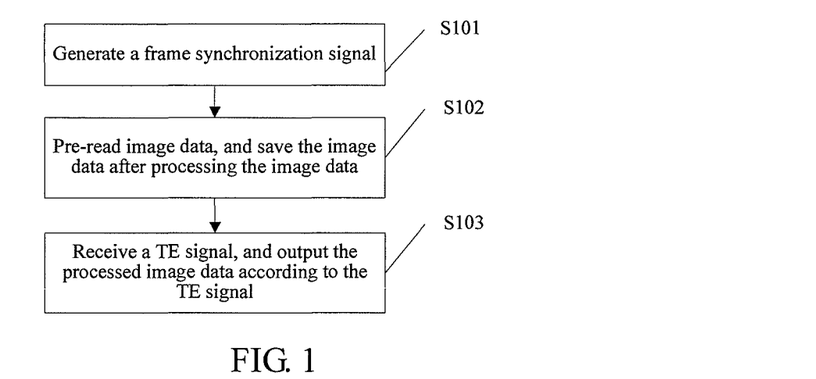
FIG. 1 is a schematic flowchart of a first embodiment of a method for quickly responding to a signal according to the present invention.

Refer to FIG. 1, which is a schematic flowchart of a first embodiment of a method for quickly responding to a signal according to the present invention. The method for quickly responding to a signal according to this embodiment includes the following steps:

S101: Generate a frame synchronization signal.

S102: Pre-read image data, and save the image data after processing the image data.

A size of the pre-read image data is determined according to a requirement of an application. For example, when a refreshing frequency of a screen is relatively high according to the requirement of the application, the size of the pre-read image data may be increased; and when the refreshing frequency of the screen is relatively low according to the requirement of the application, the size of the pre-read image data may be decreased. Certainly, at other times when a processing rate or a processing quantity of image data needs to be raised, the size of the pre-read image data may be increased.

An operation of processing the image data includes a series of image processing operations, such as image zooming-in, zooming-out, rotation, and gamma correction, which are accomplished according to the requirement of the application.

S103: Receive a TE signal, and output the processed image data according to the TE signal.

In this embodiment, according to a requirement of an application, a method of pre-reading part of image data and saving the image data after processing the image data is used to reduce, when a TE signal arrives, time for responding to the TE signal and outputting image data, improve a rate for responding to the TE signal, and avoid that a tearing effect occurs on a display screen due to a response delay; and at the same time, an instantaneous bandwidth pressure on a transmission line may be reduced during a peak period of signal transmission and data processing by pre-reading part of image data.

Figure 2:
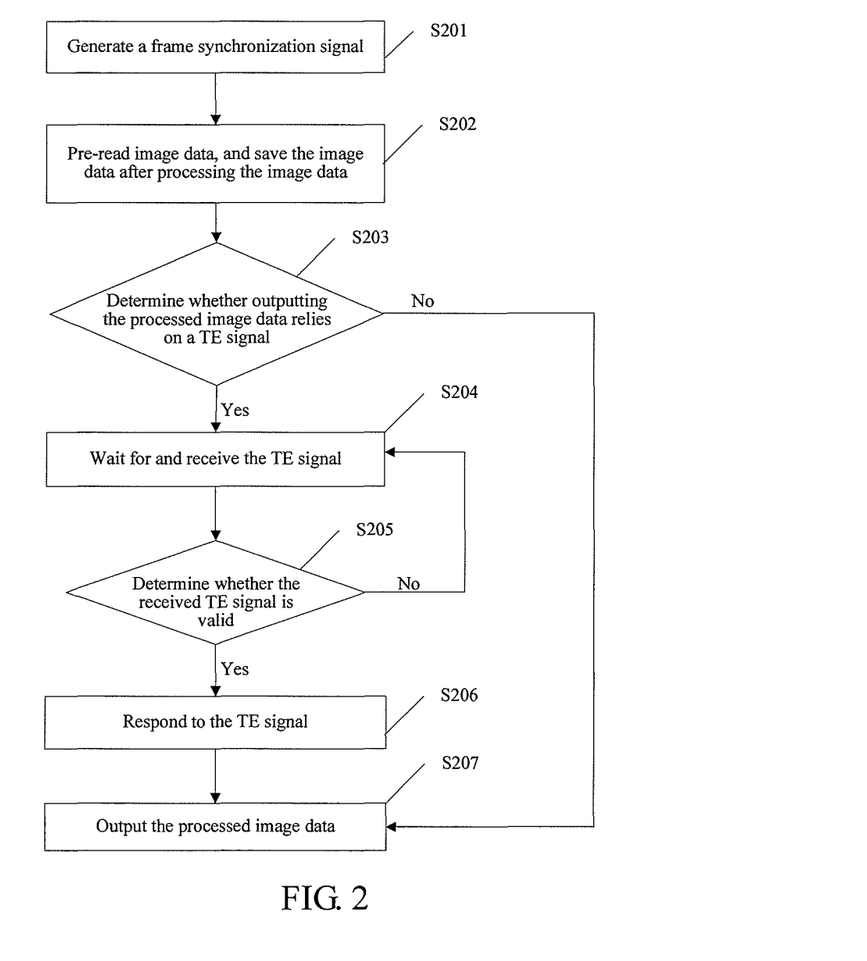
FIG. 2 is a schematic flowchart of a second embodiment of a method for quickly responding to a signal according to the present invention.

Refer to FIG. 2, which is a schematic flowchart of a second embodiment of a method for quickly responding to a signal according to the present invention. The method for quickly responding to a signal according to this embodiment includes the following steps:

S201: Generate a frame synchronization signal.

S202: Pre-read image data, and save the image data after processing the image data.

S203: Determine whether outputting the processed image data relies on a TE signal. If yes, execute step S204; otherwise, execute step S207.

S204: Wait for and receive the TE signal.

S205: Determine whether the received TE signal is valid. If yes, execute step S206; otherwise, execute step S204.

S206: Respond to the TE signal.

S207: Output the processed image data.

Outputting the processed image data may be configured as relying or not relying on the TE signal. When it is configured as not relying on the TE signal, a time sequence of data output is controlled by an image engine. When it is configured as relying on the TE signal, a frame of image data among the processed image data is output only when a valid TE signal is received.

In this embodiment, a flexible configuration of outputting the processed image data may be implemented by determining whether outputting the processed image data relies on a TE signal; in addition, the processed image data is output only when a valid TE signal has been detected, so that a mode for responding to a signal is more flexible and diversified flexible configurations may be implemented in combination with consideration of efficiency and energy consumption according to a requirement of an application.

Figure 3:
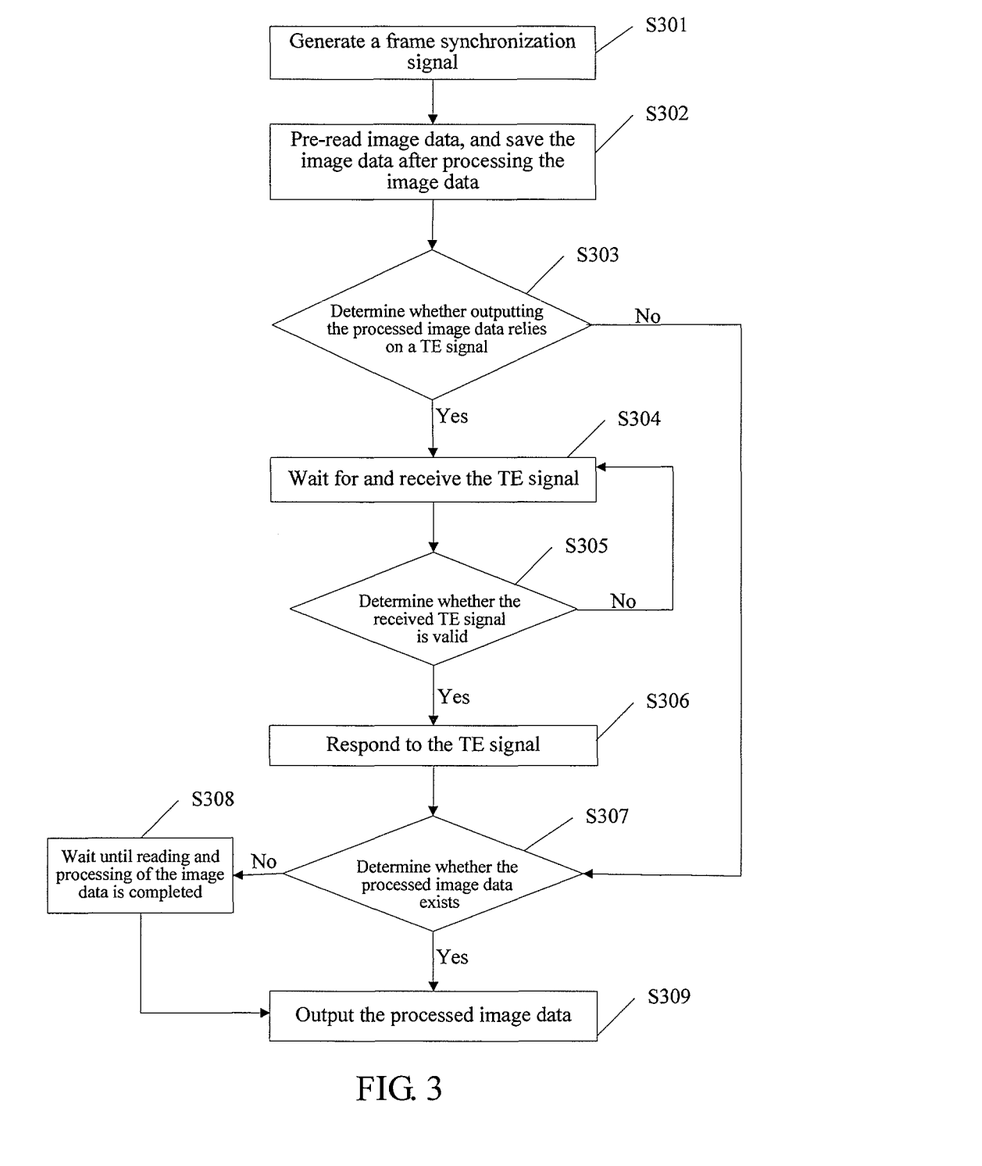
FIG. 3 is a schematic flowchart of a third embodiment of a method for quickly responding to a signal according to the present invention.

Refer to FIG. 3, which is a schematic flowchart of a third embodiment of a method for quickly responding to a signal according to the present invention. The method for quickly responding to a signal according to this embodiment includes the following steps:

S301: Generate a frame synchronization signal.

S302: Pre-read image data, and save the image data after processing the image data.

S303: Determine whether outputting the processed image data relies on a TE signal. If yes, execute step S304; otherwise, execute step S307.

S304: Wait for and receive the TE signal.

S305: Determine whether the received TE signal is valid. If yes, execute step S306; otherwise, execute step S304.

S306: Respond to the TE signal.

S307: Determine whether the processed image data exists. If yes, execute step S309; otherwise, execute step S308.

S308: Wait until reading and processing of the image data is completed.

S309: Output the processed image data.

Figure 4:
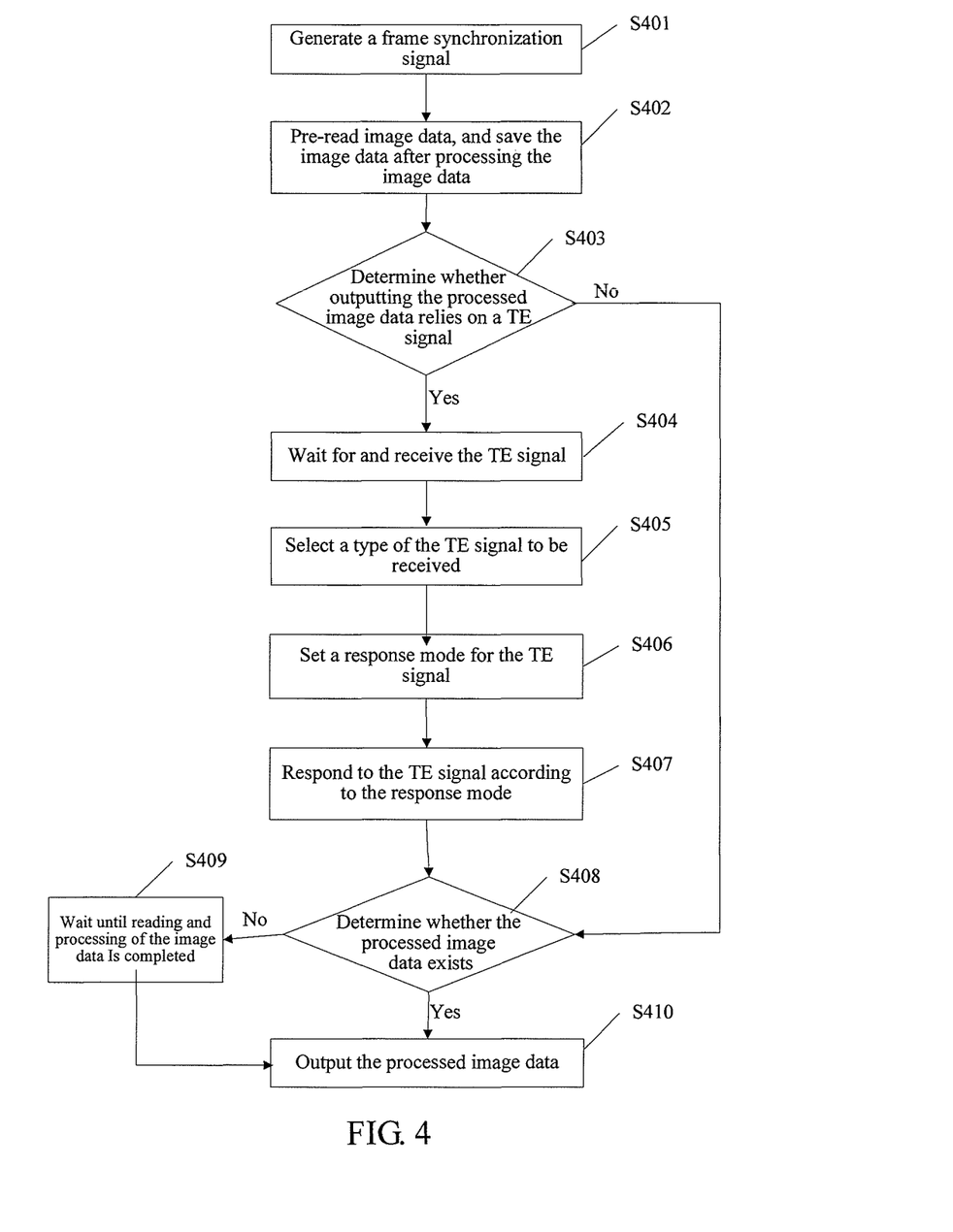
FIG. 4 is a schematic flowchart of a fourth embodiment of a method for quickly responding to a signal according to the present invention.

Refer to FIG. 4, which is a schematic flowchart of a fourth embodiment of a method for quickly responding to a signal according to the present invention. The method for quickly responding to a signal according to this embodiment includes the following steps:

S401: Generate a frame synchronization signal.

S402: Pre-read image data, and save the image data after processing the image data.

S403: Determine whether outputting the processed image data relies on a TE signal. If yes, execute step S404; otherwise, execute step S408.

S404: Wait for and receive the TE signal.

S405: Select a type of the TE signal to be received.

The type of the TE signal includes a first type and a second type, where the first type includes frame idleness information and row idleness information or includes only frame idleness information, and the second type is a TE signal that is formed after a string of sequences returned by a display screen that is used to display an image is parsed.

S406: Set a response mode for the TE signal.

A response mode for the TE signal includes a first response mode and a second response mode, where the first response mode is implemented based on a method of counting, and the second response mode is implemented based on a method of setting a response template.

S407: Respond to or ignore the TE signal according to the response mode.

S408: Determine whether the processed image data exists. If yes, execute step S410; otherwise, execute step S409.

S409: Wait until reading and processing of the image data is completed.

S410: Output the processed image data.

In this embodiment, flexible control on a response to a TE signal may be implemented through diversified signal type selection and diversified signal response mode selection, so as to meet requirements of different application scenarios.

Figure 5:
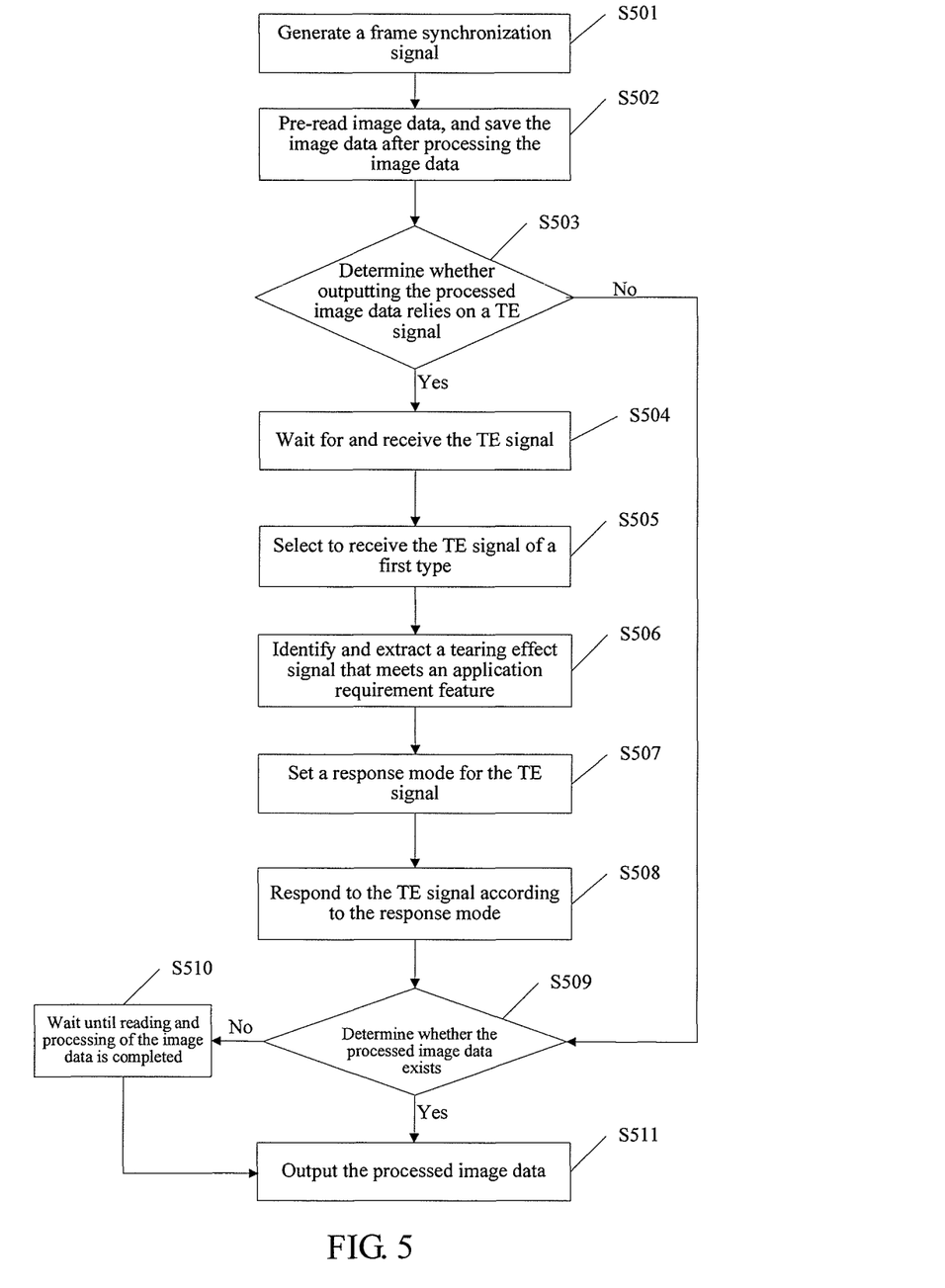
FIG. 5 is a schematic flowchart of a fifth embodiment of a method for quickly responding to a signal according to the present invention.

Refer to FIG. 5, which is a schematic flowchart of a fifth embodiment of a method for quickly responding to a signal according to the present invention. The method for quickly responding to a signal according to this embodiment includes the following steps:

S501: Generate a frame synchronization signal.

S502: Pre-read image data, and save the image data after processing the image data.

S503: Determine whether outputting the processed image data relies on a TE signal. If yes, execute step S504; otherwise, execute step S509.

S504: Wait for and receive the TE signal.

S505: Select to receive the TE signal of a first type.

S506: Identify and extract a TE signal that meets an application requirement feature.

The step of identifying and extracting a TE signal that meets an application requirement feature includes:

setting a threshold of frame idleness and a threshold of row idleness, and identifying frame idleness information and row idleness information; and setting a position of row idleness where a response is required, and extracting, in a manner of counting, the TE signal that meets the application requirement feature.

S507: Set a response mode for the TE signal.

S508: Respond to or ignore the TE signal according to the response mode.

S509: Determine whether the processed image data exists. If yes, execute step S511; otherwise, execute step S510.

S510: Wait until reading and processing of the image data is completed.

S511: Output the processed image data.

In this embodiment, a step of signal feature identification is added and may perform a function of selecting and filtering multiple TE signals.

Embodiment 1 to Embodiment 5 all describe a process of outputting a frame of image data. When a next frame of image data is processed, it needs to be determined whether a response mode of the next frame of image changes. If yes, the response mode of the next frame of image is reset; otherwise, resetting is not required, that is, processing is repeated according to a manner for processing a previous frame of image data.

Figure 6:
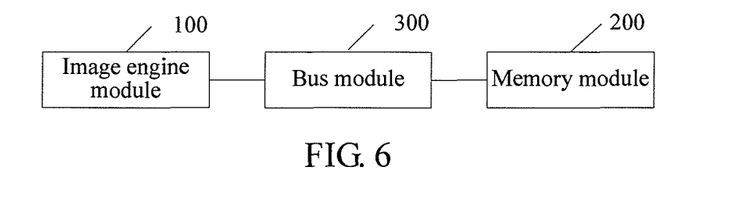
FIG. 6 is a schematic composition diagram of a first embodiment of an apparatus for quickly responding to a signal according to the present invention.

Refer to FIG. 6, which is a schematic composition diagram of a first embodiment of an apparatus for quickly responding to a signal according to the present invention. The apparatus for quickly responding to a signal according to this embodiment includes:

an image engine module 100, configured to generate a frame synchronization signal, pre-read image data, process the image data, receive a TE signal, and output the processed image data according to the TE signal;

a memory module 200, configured to store the image data; and a bus module 300, configured for data transmission and communications between various modules.

A size of the pre-read image data is determined according to a requirement of an application. When a refreshing frequency of a screen is relatively high according to the requirement of the application, the size of the pre-read image data may be increased; and when the refreshing frequency of the screen is relatively low according to the requirement of the application, the size of the pre-read image data may be decreased. Certainly, at other times when a processing rate or a processing quantity of image data needs to be raised, the size of the pre-read image data may be increased.

An operation of processing the image data includes a series of image processing operations, such as image zooming-in, zooming-out, rotation, and gamma correction, which are accomplished according to the requirement of the application.

In this embodiment, according to a requirement of an application, an image engine module pre-reads, through a bus module, part of image data in a memory module and saves the image data after processing the image data accordingly, which reduces, when a TE signal arrives, time for responding to the TE signal and outputting image data, improves a rate for responding to the TE signal, and avoids that a tearing effect occurs on a display screen due to a response delay; and at the same time, an instantaneous bandwidth pressure on the bus module may be reduced during a peak period of signal transmission and data processing by pre-reading part of image data.

Figure 7:
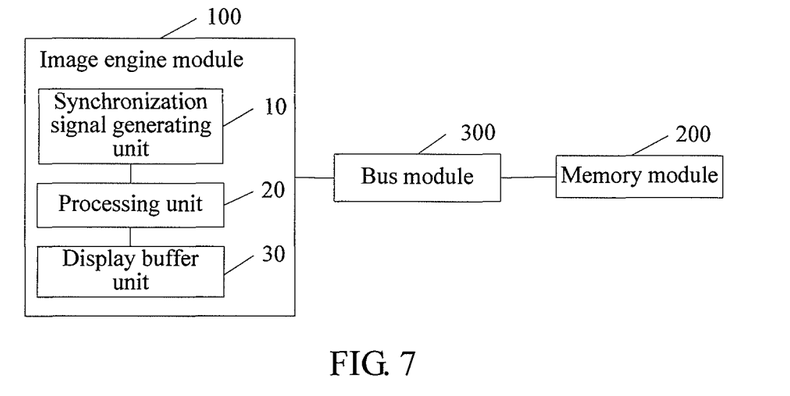
FIG. 7 is a schematic composition diagram of a second embodiment of an apparatus for quickly responding to a signal according to the present invention.

Refer to FIG. 7, which is a schematic composition diagram of a second embodiment of an apparatus for quickly responding to a signal according to the present invention. The apparatus for quickly responding to a signal according to this embodiment includes:

an image engine module 100, a memory module 200, and a bus module 300; where the image engine module 100 may include:

a synchronization signal generating unit 10, configured to generate a frame synchronization signal;

a processing unit 20, configured to pre-read image data in the memory module 200, process the image data, receive a TE signal, and output the processed image data according to the TE signal; and a display buffer unit 30, configured to save the processed image data.

Figure 8:
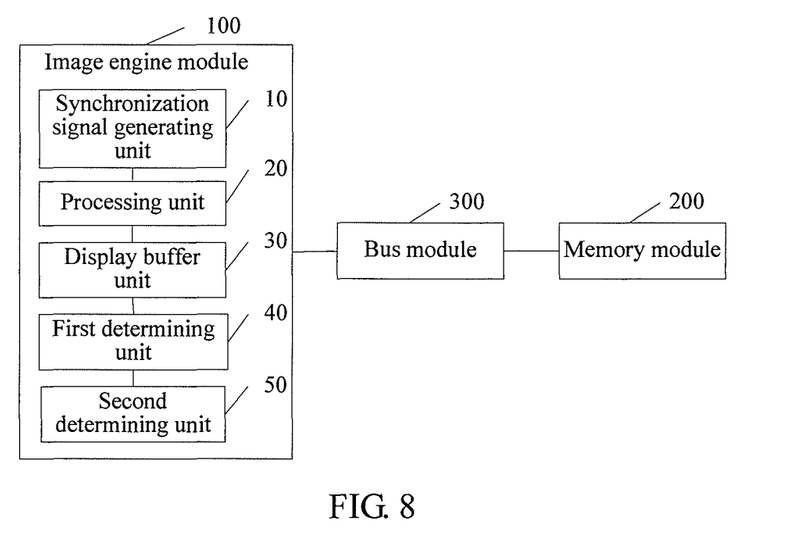
FIG. 8 is a schematic composition diagram of a third embodiment of an apparatus for quickly responding to a signal according to the present invention.

Refer to FIG. 8, which is a schematic composition diagram of a third embodiment of an apparatus for quickly responding to a signal according to the present invention. The apparatus for quickly responding to a signal according to this embodiment includes:

an image engine module 100, a memory module 200, and a bus module 300.

The image engine module 100 may include a synchronization signal generating unit 10, a processing unit 20, and a display buffer unit 30, and the image engine module 100 may further include:

a first determining unit 40, configured to determine whether the step of outputting the processed image data relies on the TE signal, where when a determining result of the first determining unit 40 is yes, the image engine module 100 waits for and receives the TE signal; otherwise, the image engine module 100 outputs the processed image data; and a second determining unit 50, configured to, when the determining result of the first determining unit 40 is yes, determine whether the TE signal received by the image engine module 100 is valid, where when a determining result of the second determining unit 50 is yes, the image engine module 100 responds to the TE signal, and outputs the processed image data according to the TE signal; otherwise, the image engine module 100 continues to wait for and receive the TE signal.

Specifically, the first determining unit 40 determines, by determining a value of a corresponding register in the image engine module 100, whether the step of outputting the processed image data relies on the TE signal. For example, it is set that a register TE-_EN is used to configure whether the step of outputting the processed image data relies on the TE signal. When the register TE_EN is 1, the image engine module 100 needs to wait for arrival of a valid TE signal before outputting a frame of image data among the processed image data; when the register TE_EN is 0, the image engine module 100 does not need to refer to the TE signal but needs only to output the processed image data according to its own time sequence information.

In this embodiment, a flexible configuration of outputting the processed image data may be implemented by determining whether outputting the processed image data relies on a TE signal; in addition, the processed image data is output only when a valid TE signal has been detected, so that a mode for responding to a signal is more flexible.

Figure 9:
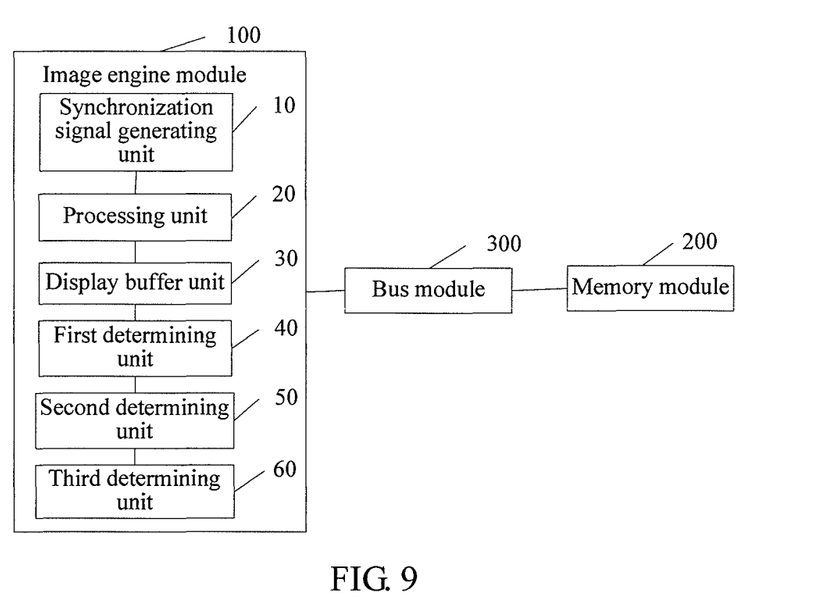
FIG. 9 is a schematic composition diagram of a fourth embodiment of an apparatus for quickly responding to a signal according to the present invention.

Refer to FIG. 9, which is a schematic composition diagram of a fourth embodiment of an apparatus for quickly responding to a signal according to the present invention. The apparatus for quickly responding to a signal according to this embodiment includes:

an image engine module 100, a memory module 200, and a bus module 300.

The image engine module 100 may include a synchronization signal generating unit 10, a processing unit 20, a display buffer unit 30, a first determining unit 40, and a second determining unit 50, and the image engine module 100 may further include:

a third determining unit 60, configured to, when a determining result of the first determining unit 40 is no and after the TE signal is responded to, determine whether the processed image data exists in the display buffer unit 30, where when a determining result of the third determining unit 60 is yes, the image engine module 100 outputs the processed image data; otherwise, the image engine module 100 waits until the image engine module 100 completes reading and processing the image data, and then outputs the processed image data.

Figure 10:
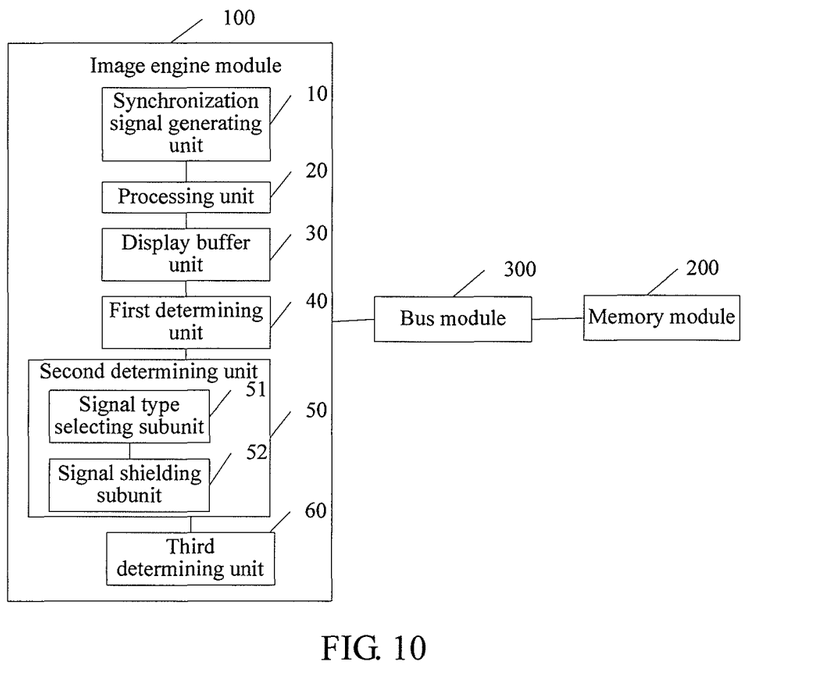
FIG. 10 is a schematic composition diagram of a fifth embodiment of an apparatus for quickly responding to a signal according to the present invention.

Refer to FIG. 10, which is a schematic composition diagram of a fifth embodiment of an apparatus for quickly responding to a signal according to the present invention. The apparatus for quickly responding to a signal according to this embodiment includes:

an image engine module 100, a memory module 200, and a bus module 300.

The image engine module 100 may include a synchronization signal generating unit 10, a processing unit 20, a display buffer unit 30, a first determining unit 40, a second determining unit 50, and a third determining unit 60.

The second determining unit 50 may include:

a signal type selecting subunit 51, configured to select a type of the TE signal to be received; and a signal shielding subunit 52, configured to set a response mode of the image engine module 100 for the TE signal, and control the image engine module 100 to respond to or ignore the TE signal.

Specifically, the type of the TE signal includes a first type and a second type, where the first type includes frame idleness information and row idleness information or includes only frame idleness information, and the second type is a TE signal that is formed after a string of sequences returned by a display screen that is used to display an image is parsed.

More specifically, there are two manners for a display screen to return the TE signal to the image engine module 100: The first manner is to transmit through a pin te_wire signal, and the second manner is to return a string of sequences to the image engine module 100 through a D-PHY interface, so that the image engine module 100 has detected the sequences and parse the sequences as a te_trigger signal. A type of the TE signal may be selected for use by configuring a corresponding register TE_SEL in the image engine module 100. For example, when the register TE_SEL is 1, tearing effect information of the display screen is obtained from the te_wire signal; and when the register TE_SEL is 0, tearing effect information of the display screen is obtained from the te_trigger signal.

A response mode for the TE signal includes a first response mode and a second response mode, where the first response mode is implemented based on a method of counting, and the second response mode is implemented based on setting of a response template.

Specifically, in the first response mode, a register TE_UNMASK in the image engine module 100 is used to configure the number of TE signals to which the image engine module 100 periodically responds, and a register TE_MASK is used to configure the number of TE signals that the image engine module 100 periodically ignores. For example, if the register TE_UNMASK is configured to 2 and the register TE_MASK is configured to 4, after consecutively responding to two TE signals, the image engine module ignores four subsequent TE signals, which repeats according to this rule when a response mode of a next frame of image does not change. If the response mode of the next frame of image changes, the signal shielding subunit 52 needs to reset the response mode of the next frame of image. When the register TE_UNMASK is configured to 0, the image engine module 100 responds to each of the TE signals. When the register TE_MASK is configured to 0, the image engine module 100 does not respond to any of the TE signals, that is, does not output image data to the display screen.

In the second response mode, a register TE_PATTER in the image engine module 100 is used to configure a specific mode for the image engine module 100 to respond to the TE signal. For example, it is assumed that the register TE_PATTER is an 8-bit register, the register TE_PATTER is configured to 0x03, and a corresponding binary value is 00000011. Then the image engine module 100 responds to first and second TE signals that are received, and ignores subsequent third, fourth, fifth, and sixth TE signals. Till now, a period of a response mode ends. When a response mode of a next frame of image does not change, continue to respond to two received TE signals and ignore four subsequent TE signals, which repeats according to this rule. If the response mode of the next frame of image changes, the signal shielding subunit 52 needs to reset the response mode of the next frame of image.

For some display scenarios on a consumable electronic device, such as full-screen video playing, although a refreshing rate of a display screen may be maintained at 60 Hz, video display on the display screen may be kept smooth as long as a rate for the image engine module 100 to update a memory of the display screen reaches 25 Hz or higher. In addition, reducing a rate for the image engine module 100 to update a memory of the display screen may effectively reduce power consumption of a display interface link.

Therefore, in this embodiment, flexible control on a response to the TE signal may be implemented through diversified signal type selection and diversified signal response mode selection, thereby implementing diversified flexible configurations according to requirements of different application scenarios; and in combination with consideration of efficiency and energy consumption, part of TE signals are ignored and an output frame rate of an image engine module is reduced, thereby reducing power consumption of an apparatus.

Figure 11:
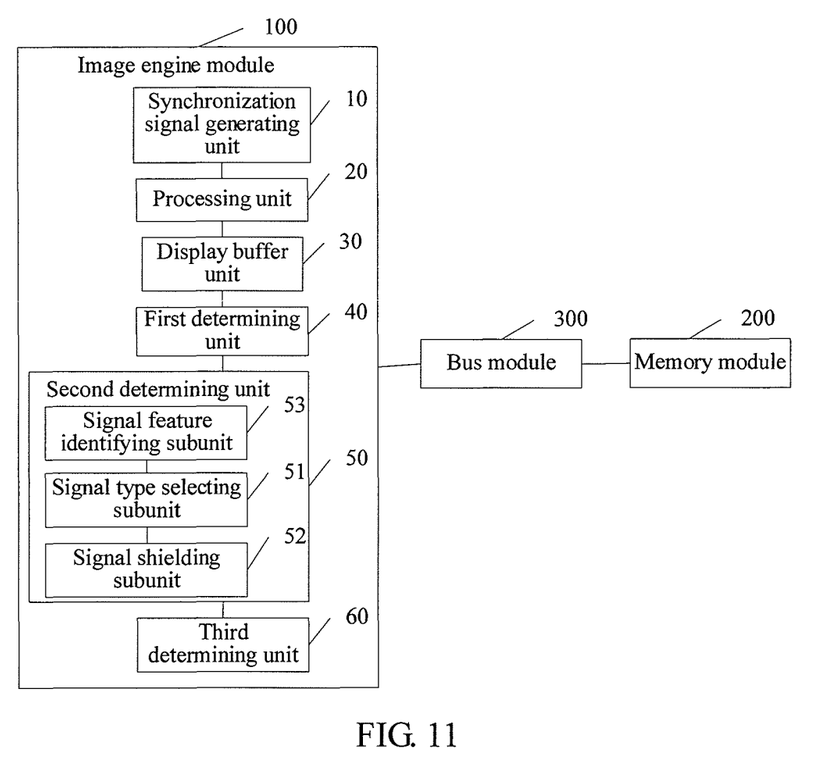
FIG. 11 is a schematic composition diagram of a sixth embodiment of an apparatus for quickly responding to a signal according to the present invention.

Refer to FIG. 11, which is a schematic composition diagram of a sixth embodiment of an apparatus for quickly responding to a signal according to the present invention. The apparatus for quickly responding to a signal according to this embodiment includes: an image engine module 100, a memory module 200, and a bus module 300.

The image engine module 100 may include a synchronization signal generating unit 10, a processing unit 20, a display buffer unit 30, a first determining unit 40, a second determining unit 50, and a third determining unit 60.

The second determining unit 50 may include a signal type selecting subunit 51 and a signal shielding subunit 52, and the second determining unit 50 may further include:

a signal feature identifying subunit 53, configured to, when a type which is of the TE signal and is selected by the signal type selecting subunit 51 is the first type, identify and extract a TE signal that meets an application requirement feature.

Specifically, the signal feature identifying subunit 53 is configured to identify a tearing effect pulse that meets an application requirement feature from a pin te_wire signal that is output by a display screen.

More specifically, the signal feature identifying subunit 53 identifies, by setting a threshold of frame idleness and a threshold of row idleness, frame idleness information and row idleness information, and extracts, by setting a position of row idleness where a response is required and in a manner of counting, the TE signal that meets the application requirement feature. For example, it is assumed that the pin te_wire signal output by the display screen includes frame idleness information and row idleness information. Configure a register V_WIDTH that corresponds to the threshold of frame idleness and is in the image engine module 100 to 500, configure a register H_WIDTH that corresponds to the threshold of row idleness and is in the processing unit 20 to 100, and configure a register H_NUM that corresponds to the number of row idleness and is in the image engine module 100 to 10. When it has been detected that a pulse width is larger than 500 clock periods, the pulse is considered as frame idleness information; and when it has been detected that a pulse width is smaller than 500 clock periods but large than 100 clock periods, the pulse is considered as row idleness information. When a 10th pulse of row idleness has been detected, this pulse signal is output and indicates that the TE signal meeting the application requirement feature has been detected.

In this embodiment, the signal feature identifying subunit 53 is added and may perform a function of selecting and filtering multiple TE signals.

The present invention has the following advantages according to the description of the foregoing embodiments:

According to a requirement of an application, a method of pre-reading part of image data and saving the image data after processing the image data is used to reduce, when a TE signal arrives, time for responding to the TE signal and outputting image data, improve a rate for responding to the TE signal, and avoid that a tearing effect occurs on a display screen due to a response delay; at the same time, an instantaneous bandwidth pressure on a transmission line may be reduced during a peak period of signal transmission and data processing by pre-reading part of image data; outputting the processed image data may be configured as relying or not relying on the TE signal, and flexible control on a response to the TE signal may be implemented through diversified signal type selection and diversified signal response mode selection, thereby implementing diversified flexible configurations according to requirements of different application scenarios; and in combination with consideration of efficiency and energy consumption, part of TE signals are ignored and an output frame rate of an image engine module is reduced, thereby reducing power consumption of an apparatus.

Persons of ordinary skill in the art may understand that all or part of the processes of the methods in the foregoing embodiments may be implemented by a computer program instructing relevant hardware. The program may be stored in a computer readable storage medium. When the program is run, the processes of the methods in the foregoing embodiments are performed. The storage medium may be a magnetic disk, an optical disk, a read-only memory (Read-Only Memory, ROM), or a random access memory (Random Access Memory, RAM), or the like.

The foregoing disclosed description is merely exemplary embodiments of the present invention, and certainly is not intended to limit the scope of the claims of the present invention. Therefore, equivalent variations made according to the claims of the present invention shall fall within the scope of the present invention.

What is claimed is:

1. A method for quickly responding to a signal, the method comprising:
   generating a frame synchronization signal;
   pre-reading image data, processing the image data, and saving the processed image data;
   receiving a tearing effect (TE) signal, and outputting the processed image data according to the TE signal;
   wherein receiving the TE signal, and outputting the processed image data according to the TE signal comprises:
   determining whether outputting the processed image data relies on the TE signal,
      if outputting the processed image data relies on the TE signal, waiting for and receiving the TE signal, and determining whether the received TE signal is valid and if the received TE signal is valid, responding to the TE signal, and outputting the processed image data according to the TE signal, or
      if outputting the processed image data does not rely on the TE signal, outputting the processed image data;
   wherein determining whether the received TE signal is valid comprises:
      selecting a type of the TE signal to be received,
      setting a response mode for the TE signal, and
      responding to or ignoring the TE signal according to the response mode; and
   wherein the type of the TE signal comprises a first type and a second type, the first type comprises frame idleness information and row idleness information or comprises only frame idleness information, and the second type comprises a TE signal that is formed after a string of sequences returned by a display screen that is used to display an image is parsed.

2. The method according to claim 1, wherein a size of the pre-read image data is determined according to a requirement of an application.

3. The method according to claim 1, wherein processing the image data comprises image zooming-in, zooming-out, rotation, and gamma correction.

4. The method according to claim 1, wherein outputting the processed image data if outputting the processed image data does not rely on the TE signal comprises:
  determining whether the processed image data exists;
  if processed image data does exist, outputting the processed image data; and
  if processed image data does not exist, waiting until reading and processing of the image data is completed, and then outputting the processed image data.

5. The method according to claim 1, wherein after responding to the TE signal if the received TE signal is valid, the method further comprises:
  determining whether the processed image data exists;
  if processed image data does exist, outputting the processed image data; and
  if processed image data does not exist, waiting until reading and processing of the image data is completed, and then outputting the processed image data.

6. The method according to claim 1, wherein a TE signal is identified and extracted when the TE signal meets an application requirement feature and when the TE signal is the first type.

7. The method according to claim 6, wherein identifying and extracting a TE signal that meets an application requirement feature comprises:
  setting a threshold of frame idleness and a threshold of row idleness, and identifying frame idleness information and row idleness information; and
  setting a position of row idleness where a response is required, and extracting, in a manner of counting, the TE signal that meets the application requirement feature.

8. The method according to claim 1, wherein after outputting the processed image data, the method further comprises:
  determining whether a response mode of a next frame of image changes; and
  if the response mode of the next frame of image changes, resetting the response mode of the next frame of image.

9. An apparatus for quickly responding to a signal, comprising:
  an image engine module, configured to generate a frame synchronization signal, pre-read image data, process the image data, receive a tearing effect (TE) signal, and output the processed image data according to the TE signal;
  a memory module, configured to store the image data;
  a bus module, configured for data transmission and communications between various modules;
  wherein the image engine module comprises:
    a synchronization signal generating unit configured to generate the frame synchronization signal;
    a processing unit configured to pre-read the image data in the memory module, process the image data, receive the TE signal, and output the processed image data according to the TE signal; and
    a display buffer unit, configured to save the processed image data;
  wherein the image engine module further comprises:
    a first determining unit, configured to:
      determine whether outputting the processed image data relies on the TE signal, and if outputting the processed image data relies on the TE signal, the image engine module waits for and receives the TE signal, or
      if outputting the processed image data does not rely on the TE signal, the image engine module outputs the processed image data; and
    a second determining unit, configured to:
      if outputting the processed image data relies on the TE signal, determine whether the received TE signal is valid and if the received TE signal is valid, the image engine module responds to the TE signal, and outputs the processed image data according to the TE signal, or
      if the received TE signal is not valid, the image engine module continues to wait for and receive the TE signal;
  wherein the second determining unit comprises:
    a signal type selecting subunit, configured to select a type of the TE signal to be received; and
    a signal shielding subunit, configured to set a response mode of the image engine module for the TE signal, and control the image engine module to respond to or ignore the TE signal;
  wherein the type of the TE signal comprises a first type and a second type, the first type comprises frame idleness information and row idleness information or comprises only frame idleness information, and the second type is a TE signal that is formed after a string of sequences returned by a display screen that is used to display an image is parsed.

10. The apparatus according to claim 9, wherein a size of the pre-read image data is determined according to a requirement of an application.

11. The apparatus according to claim 10, wherein processing the image data comprises image zooming-in, zooming-out, rotation, and gamma correction.

12. The apparatus according to claim 9, wherein the image engine module further comprises:
  a third determining unit, configured to:
    if outputting the processed image data does not rely on the TE signal, and after the TE signal is responded to, determine whether the processed image data exists in the display buffer unit, wherein if processed image data does exist, the image engine module outputs the processed image data; and if processed image data does not exist, the image engine module waits until reading and processing of the image data is complete, and then outputs the processed image data.

13. The apparatus according to claim 9, wherein the second determining unit further comprises:
  a signal feature identifying subunit configured to identify and extract a TE signal of the first type selected by the signal type selecting subunit when the TE signal meets an application requirement feature.

* * * * *